(12) United States Patent
Ghosh et al.

(10) Patent No.: US 10,725,939 B2
(45) Date of Patent: Jul. 28, 2020

(54) HOST-DETECTING USB HUB

(71) Applicant: Microchip Technology Incorporated, Chandler, AZ (US)

(72) Inventors: Atish Ghosh, Austin, TX (US); Mark Gordon, Tempe, AZ (US); Ken Nagai, Phoenix, AZ (US); Larisa Troyegubova, Nesconset, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/894,007

(22) Filed: Feb. 12, 2018

(65) Prior Publication Data

US 2018/0232323 A1 Aug. 16, 2018

Related U.S. Application Data

(60) Provisional application No. 62/458,281, filed on Feb. 13, 2017.

(51) Int. Cl.
*G06F 3/00* (2006.01)
*G06F 13/12* (2006.01)
*G06F 13/42* (2006.01)
*G06F 13/40* (2006.01)
*G06F 13/38* (2006.01)

(52) U.S. Cl.
CPC .......... *G06F 13/122* (2013.01); *G06F 13/385* (2013.01); *G06F 13/4068* (2013.01); *G06F 13/4291* (2013.01); *G06F 2213/0042* (2013.01); *Y02D 10/14* (2018.01); *Y02D 10/151* (2018.01)

(58) Field of Classification Search
CPC ... G06F 13/00; G06F 7/00; G06F 1/00; G06F 5/00; G06F 9/00
USPC .............................................. 710/12, 20, 36
See application file for complete search history.

(56) References Cited

U.S. PATENT DOCUMENTS

| | | | | |
|---|---|---|---|---|
| 6,128,743 A | * | 10/2000 | Rothenbaum | G06F 1/266 710/100 |
| 2007/0255885 A1 | * | 11/2007 | Bohm | G06F 13/4022 710/316 |
| 2014/0111030 A1 | * | 4/2014 | Chou | G05F 1/10 307/130 |

(Continued)

FOREIGN PATENT DOCUMENTS

WO 2016/175983 A1 11/1916 ............. G06F 13/38

OTHER PUBLICATIONS

"Universal Serial Bus Type-C Cable and Connector Specification," Revision 1.2, USB 3.0 Promotor Group, URL: http://www.usb.org/developers/docs/, 221 pages, Mar. 25, 2016.

(Continued)

*Primary Examiner* — Tim T Vo
*Assistant Examiner* — Kim T Huynh
(74) *Attorney, Agent, or Firm* — Slayden Grubert Beard PLLC (57) ABSTRACT

An apparatus includes a processor and a machine-readable medium coupled to the processor and comprising instructions. The instructions, when loaded into the processor and executed, configure the processor to identify that a USB element has attached to a USB hub at a port, classify the USB element according to power operations of the USB element, and assign an upstream or downstream setting of the port based upon the classification of the USB element based on power operations of the USB element.

19 Claims, 3 Drawing Sheets

(56) References Cited

U.S. PATENT DOCUMENTS

2015/0318728 A1   11/2015  Ghosh et al. ................. 320/107
2016/0350251 A1*  12/2016  Lee ..................... G06F 13/4022

OTHER PUBLICATIONS

International Search Report and Written Opinion, Application No. PCT/US2018/017925, 11 pages, dated Apr. 6, 2018.

* cited by examiner

HOST-DETECTING USB HUB

RELATED APPLICATIONS

This application claims priority to U.S. Provisional Patent Application No. 62/458,281 filed Feb. 13, 2017, the contents of which are hereby incorporated in their entirety.

TECHNICAL FIELD

The present disclosure relates to universal serial bus (USB) and, more particularly, to a host-detecting USB hub.

BACKGROUND

Figure 1A:
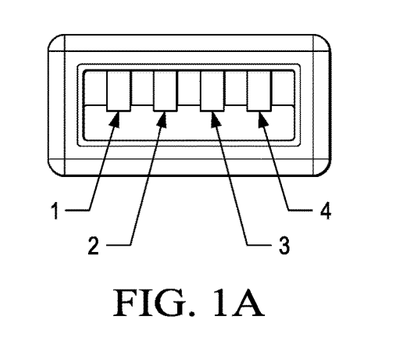
FIGS. 1A-1B are illustrations of the shape of USB type A and type B connectors.
Figure 1B:
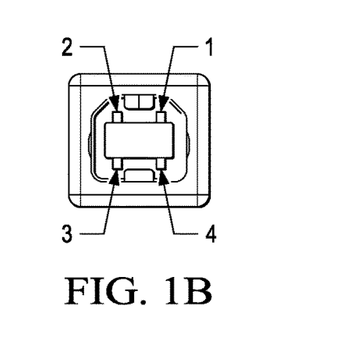

A USB connector may be a type "A" connector with rectangular shape and four pints. USB type A connectors can be found on upstream devices such as a USB host or a hub. USB type A plugs can be found on cables, and smaller peripherals such as a mouse and a flash drive. However, USB devices and peripherals such as printers and scanners use the USB type "B" receptacle. A USB type b connector has a shape that is more akin to a square. FIGS. 1A and 1B illustrate examples of these connectors.

Connecting a peripheral to a host involves a USB type A to type B cable. The two types of plugs have the same number of pins, and are electrically identical. They are only different mechanically. This was an intentional feature designed by the USB specification to prevent connecting a host to another host, which could cause a short circuit.

Figure 2:
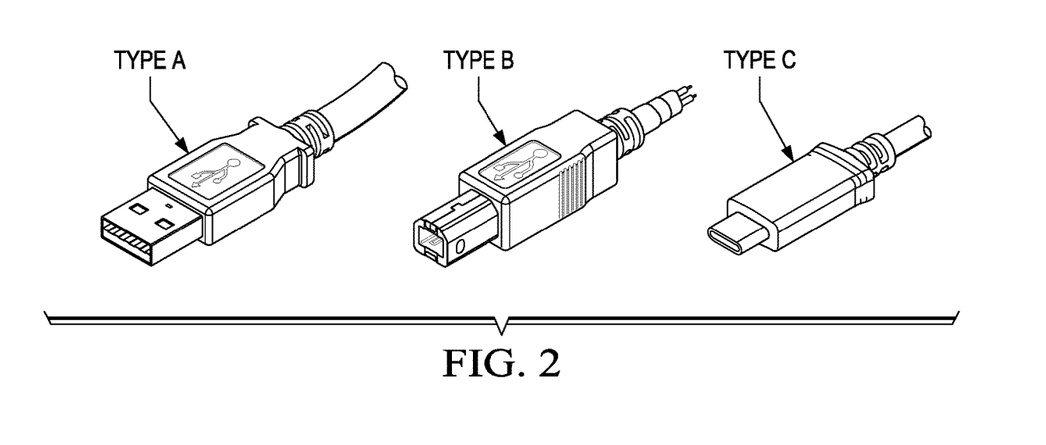
FIG. 2 is an illustration of example implementations of USB type A, type B, and type C connectors.

More recently, a USB type "C" connector has been developed. FIG. 2 illustrates examples of USB types A, B, and C. While USB type A and type B connectors are unidirectional, a USB type C connector is bidirectional. type C connectors were developed with the advent of the USB Specification version 3.0 and later. Versions of the USB Specification include 1.1, 2.0, 3.0, and 3.1. USB 1.1 was released in 1998 and has a top speed of 12 Mbps. In many cases, USB 1.1 only performs at 1.2 Mbps. Released in 2000, USB 2.0 has a maximum speed of 480 Mbps in hi-Speed mode, or 12 Mbps. It is backward-compatible with USB 1.1 and has a maximum output power of 2.5 V (1.8 A). USB 3.0 was released in 2008 and has a top speed of 5 Gbps in SuperSpeed mode. It is backward-compatible with USB 2.0, and can deliver up to 5V (1.8 A) of power.

The most recent version of USB is 3.1, which was released in 2013 and doubles the speed of 10 Gbps. It is backward-compatible with USB 3.0 and USB 2.0. USB 3.1 has three power profiles and allows larger devices to draw power from the host: up to 2 A at 5 V (for a power consumption of up to 10 W), and up to 5 A at either 12V (60 W) or 20V (100 W).

With a flat and rectangular shape, the USB type-A was the original design for the first USB standard. On a traditional USB cable, the type-A connector, also known as the A-male connector goes into a host, and the USB port where the type A-male is inserted into is referred to as a type A-female port. type-A ports are typically in host devices, such as desktop computers, laptops, game consoles, keyboards, mice, thumb drives, head units, and media players. Generally, the type-B connector is the end of the standard USB cable that plugs into a peripheral device such as a printer, phone, or external hard drive, and is also known as the type B-male. The port on the device itself is referred to as the type B-female.

Since peripheral devices come in a variety of shapes and sizes, the type-B connector and its companion port also come in several different designs. Designs for the USB type-B's plugs and connectors include the original Standard-B, the Mini-B, Micro-B USB, Micro-B USB 3.0, and the Standard-B USB 3.0.

SUMMARY

Embodiments of the present disclosure include an apparatus. The apparatus may include a processor, a machine-readable medium coupled to the processor and comprising instructions. The instructions, when loaded into the processor and executed, may configure the processor to identify that a USB element has attached to a USB hub at a port, classify the USB element according to power operations of the USB element, and assign an upstream or downstream setting of the port based upon the classification of the USB element based on power operations of the USB element. In combination with any of the above embodiments, the apparatus may further include instructions for configuring the processor to classify the USB element as only a consumer of power and, based on the classification of the USB element as only a consumer of power, set the port as a downstream port. In combination with any of the above embodiments, the apparatus may further include instructions for configuring the processor to classify the USB element as only a consumer of power and, based on the classification of the USB element as only a consumer of power, designate the USB element as a USB device with respect to the hub. In combination with any of the above embodiments, the apparatus may further include instructions for configuring the processor to, based on the classification of the USB element as only a consumer of power, set the port as a downstream port until the USB element detaches. In combination with any of the above embodiments, the apparatus may further include instructions for configuring the processor to, classify the USB element as only a producer of power and, based on the classification of the USB element as only a producer of power, set a timeout period to evaluate whether to handle the USB element as a USB host or a USB device. In combination with any of the above embodiments, the apparatus may further include instructions for configuring the processor to, based on the classification of the USB element as only a producer of power, evaluate whether an enumeration process is initiated to determine whether to handle the USB element as a USB host or a USB device. In combination with any of the above embodiments, the apparatus may further include, based on the classification of the USB element as only a producer of power, evaluate whether an enumeration process is initiated to determine whether to set the port as a downstream port or an upstream port. In combination with any of the above embodiments, the apparatus may further include instructions for configuring the processor to, based on the classification of the USB element as only a producer of power, evaluate whether an enumeration process is initiated within a timeout period and, based on a determination that the enumeration process is initiated within the timeout period, set the port as an upstream port. In combination with any of the above embodiments, the apparatus may further include instructions for configuring the processor to, based on the classification of the USB element as only a producer of power, evaluate whether an enumeration process is initiated within a timeout period and, based on a determination that the enumeration process is not initiated within the timeout period, setting the port as a downstream port. In combination with any of the above embodiments, the apparatus may further include instructions for configuring the processor to, based on the classification of the USB element as only a producer of power, evaluate whether an enumeration process is initiated within a timeout period, and, based on a determination that the enumeration process is initiated within the timeout period, assign the USB element as a USB host. In combination with any of the above embodiments, the apparatus may further include instructions for configuring the processor to, based on a determination that the enumeration process is not initiated within the timeout period, assign the USB element as a USB device. In combination with any of the above embodiments, the apparatus may further include instructions for configuring the processor to, based on a determination that the enumeration process is not initiated within the timeout period, handle the attachment as a power adapter. In combination with any of the above embodiments, the apparatus may further include instructions for configuring the processor to classify the USB element as capable of both producing and receiving power and, based on the classification of the USB element as capable of both producing and receiving power, treat the USB element as a laptop. In combination with any of the above embodiments, the apparatus may further include instructions for configuring the processor to, based on the classification of the USB element as capable of both producing and receiving power, negotiate with the USB element to provide power from the hub while allowing the USB element to request USB host properties.

Embodiments of the present disclosure may include a USB hub, USB master device, microcontroller, processor, USB controller, or electronic device including any of the apparatuses described above.

Embodiments of the present disclosure may include methods performed by operation of any of the apparatuses, USB hubs, USB master devices, microcontrollers, processors, USB controllers, or electronic devices described above.

DETAILED DESCRIPTION

Figure 3:
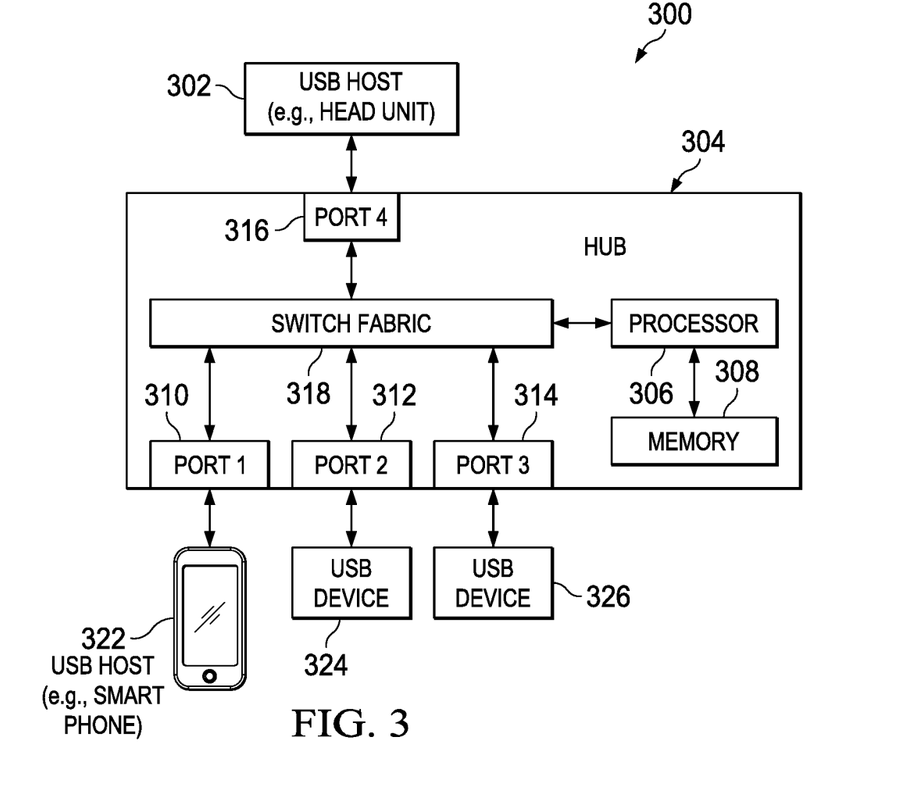
FIG. 3 is an illustration of an example system for detecting USB hosts, according to embodiments of the present disclosure.

FIG. 3 is an illustration of an example system 300 for detecting USB hosts, according to embodiments of the present disclosure. In particular, detection of USB hosts may be performed in a USB hub or another suitable electronic device. In FIG. 3, detection of USB hosts may be performed by a USB hub 304. The functionality of USB hub 304 may be in a stand-alone electronic device, or incorporated within other electronic devices such as a USB host.

Hub 304 may be implemented in analog circuitry, digital circuitry, instructions for execution by a processor, or any suitable combination thereof. In the example of FIG. 3, hub 304 may include a machine-readable medium such as memory 308 that includes instructions that, when executed by a processor such as processor 306, may configure hub 304 to perform the operations and functionality of the present disclosure. Hub 304 may include switch fabric 318 or other suitable switching circuits to route signals between various USB ports, such as port 1 310, port 2 312, port 3 314, and port 4 316.

Various USB elements may be connected to hub 304. For example, a USB host 302 may be connected to hub 304. USB host 302 may be, for example, a head unit of a vehicle audio system. USB hub 304 may also be connected to another USB element such as a smart phone 322, which may act as a USB host or as a USB device. USB hub 304 may be connected to USB devices 324, 326.

In one embodiment, USB hub 304 may be configured to detect which of its ports that a USB host is connected. In another embodiment, USB hub 304 may be configured to, once a determination that a USB is connected has been made, adjust its own settings correctly.

Traditionally, USB architecture was built around a single host. A hub port facing the host may be considered an upstream port. A hub port facing away from the host may be considered a downstream port. A traditional downstream port may be referenced as a "A" port, while a traditional upstream port may be referenced as a "B" port. These may correspond to functionality of USB type A and type B connectors. As shown in FIGS. 1 and 2, traditionally an A port is physically different than a B port. It is not possible to connect a system incorrectly, wherein an A USB connector is inserted into a B port, or vice-versa.

With the advent of the USB 3.0 standard, a new type of port and connector is available, named the "C" port, corresponding to a USB type C connector. The USB type C connector is physically the same in both the upstream and downstream directions. It is bi-directional, and thus both ends on a USB cable with USB type C connectors will be the same, whereas other cables would include one "A" connector and one "B" connector.

However, USB hubs such as hub 304 are unique among other USB elements in that there are functional differences in their performance based upon downstream or upstream operation. Thus, there may be difficulty in determining whether a given USB hub port is upstream or downstream when using USB type C connectors, because the downstream and upstream USB type C hub ports are the same. In some embodiments, a USB type C hub upstream port is marked as such so that it is correctly connected to an appropriate host. In a further embodiment, the unmarked USB "C" hosts are thus used as downstream ports. In practice, the marking of ports in this manner may have been left to the builders of the USB hub. This may lead to further difficulties in implementations, as in other systems some USB type C ports are to be unidirectional, or are to be only connected to USB devices, while only a certain designated USB type C port is to be connected to USB hosts or USB dual-role elements such as smart phone 322.

In one embodiment, hub 304 may be configured to allow a given downstream port to be swapped with an upstream hub. Hub 304 may implement functionality such as Flex-Connect™ from Microchip Technology, Inc. Accordingly, hub 304 may be configured to detect a host removal. The removal detection might not otherwise require use or monitoring of the USB-supplied VBUS signal. Hub 304 may initially operate with all ports in a dual-role mode, with no designated upstream-only ports. Upon detection of a host on any port, that port may be designated as the USB host and all other ports may be designated as downstream ports. The port on which the host is detected may be designated the upstream port. Under standard USB definitions, only a single host is allowed to be specified—a second host would be locked out. However, hub 304 may allow multiple USB hosts.

For example, hub 302 may detect USB host 302 connecting to hub 304. Port 4 316 may be configured as an upstream port and ports 310, 312, 314 designated as downstream ports. Next, hub 302 may allow smart phone 322 to attach. Smart phone 322 may also attempt to act as a USB host. Hub 302 may bridge and mediate between host 302 and smart phone 322 for access or control of some operations of host 302. A consumer may connect smart phone 322 to a car dash through an auxiliary USB cable. Host 302 may recognize smart phone 322 through identifiers on smart phone 322. Hub reconfiguration may begin. Host 302, controlling hub 304, may grant a request from the smart phone 322 of host 302. Hub 304 may switch the control (as designating the host) from any previous host (such as host 302) to smart phone 322. In a full or limited way, host 302 may then function as a USB device with respect to smart phone 322, as opposed to a host. Furthermore, host 302 may function as a USB on-the-go (OTG) device. Music, navigation GUI, voice recognition, and other functions of host 302 may be executed by or under direction of smart phone 322. Smart phone 322, acting as the new host, may operate with other ports such as port 2 312 and port 3 314. For example, smart phone 322 may designate these other ports as dedicated charging ports. USB entities connected to these other ports may be charged, but might act only as USB devices as opposed to USB hosts.

When attaching something with a USB type C connector to hub 304, the USB element that is being attaching can be a provider of power, a consumer of power, or function in a dual role, meaning that it can both provide and consume power. A desktop PC may be a provider of power. A laptop may be a dual-role element. For example, if a thumb drive is connected to the laptop, the laptop may act to provide power to the thumb drive. If a laptop is attached to a monitor or power source, it may receive power from the monitor power source. An element such as the thumb drive might act permanently as a consumer of power. An alternating current power adapter or other power adapter might act permanently as a provider of power.

In one embodiment, hub 304 may determine whether a USB element attaching to hub 304 is configured or designated to only or permanently consume power, as opposed to producing power. In such a case, the port to which the USB element is attaching may be designated as a downstream port. The port may be always designated as a downstream port while the element in question is connected to the hub.

In one embodiment, hub 304 may determine whether a USB element attaching to hub 304 is configured or designated to only or permanently produce power, as opposed to consuming power. In such a case, a timeout period may be set. During or at the end of a such a period, hub 304 may determine whether the USB element initiated an enumeration process.

The USB enumeration process may include the process of a host detecting that a USB device has been connected, identify what has been connected, and then loading the relevant device drivers. While there are six device states specified under USB, during enumeration, a device moves through four of the states: Powered, Default, Address, and Configured. This involves a mixture of hardware techniques for detecting something is present and software to identify what has been connected. After detecting the presence of a device, the host will initiate a transfer with the device to determine the identity of the device. The host does this by asking for device descriptors which define the device class of the USB device and what drivers need to be loaded.

If, during the timeout period, no enumeration process occurred, then the port may be configured or considered an AC adapter, or otherwise a producer of power. The USB element attach process may have been for an AC adapter. Hub 304 or the host may determine that the port is not a host port. If there is an enumeration process that occurred during the timeout period, then the port is configured as a host port by hub 304.

In one embodiment, hub 304 may detect an attachment of a USB element that is configured or designated as a dual role device, capable of producing or receiving power. In such a case, hub 304 may negotiate handling of the element in the manner described above, wherein if possible the laptop may be established as a host if other hosts are able to yield some or all control. Hub 304 may negotiate with the element to provide power while allowing it to take over as a USB host if so requested.

The identity of a USB element as a producer-only, receiver-only, or dual-role with respect to power may be made in any suitable way by hub 304. For example, the identity may be read from or inferred from data exchanged in handshakes as part of the USB connection process.

Figure 4:
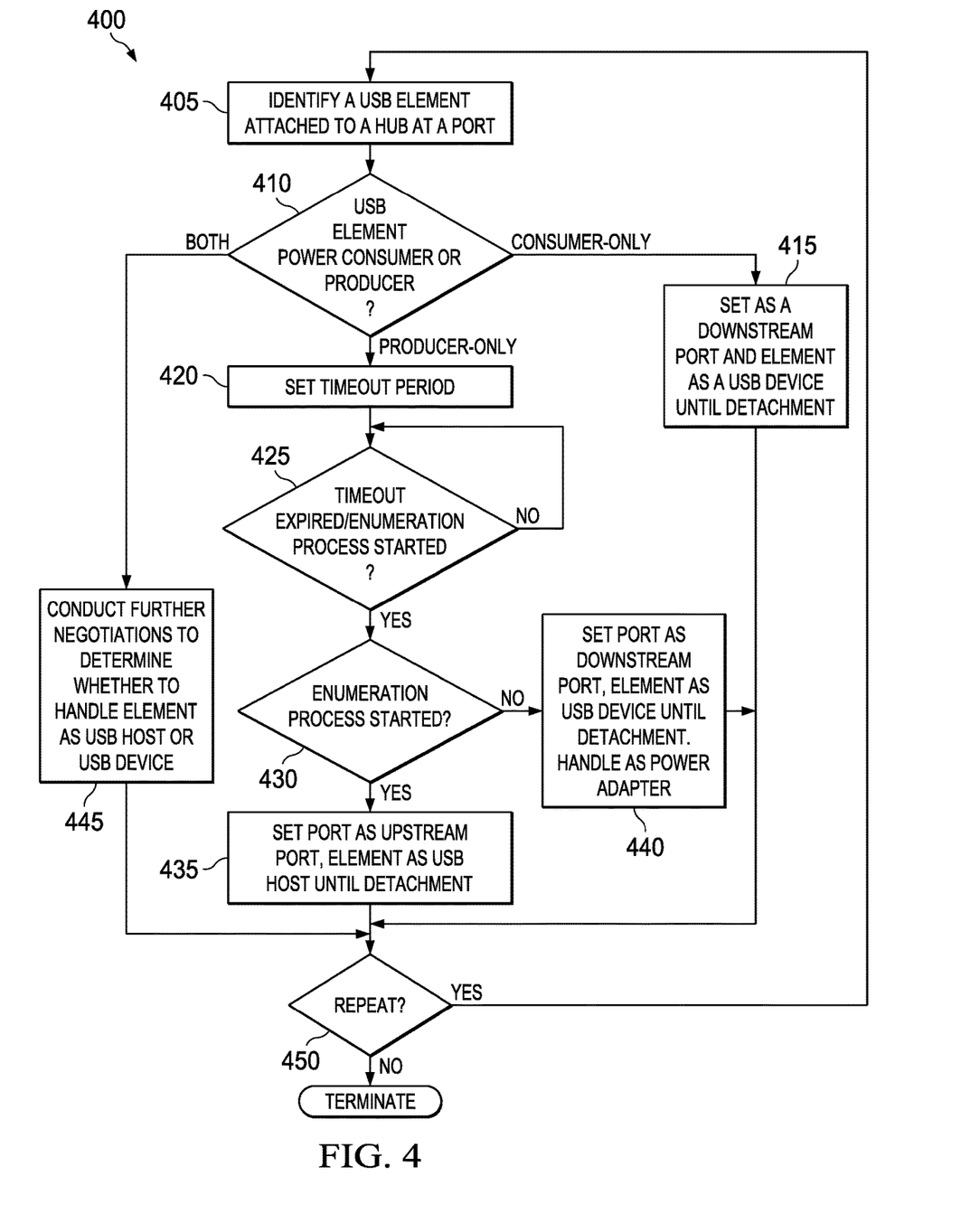
FIG. 4 is an illustration of an example method for detecting USB hubs, according to embodiments of the present disclosure.

FIG. 4 is an illustration of an example method 400 for detecting USB hubs, according to embodiments of the present disclosure. Method 400 may be initiated at any suitable step, such as 405. Method 400 may be implemented fully or in-part by instructions on a machine-readable medium for execution by one or more processors. Method 400 may be implemented fully or in-part by hub 304 of FIG. 3. Portions of method 400 may be repeated, omitted, or performed recursively. Although example steps are shown for method 400, fewer or additional steps may be included in various implementations.

At 405, a USB element may be attached to a hub at a given port. The attachment may be detected by the hub. The attachment may be followed by an identification process to identify the nature of and characteristics of the USB element. The USB element may be identified through queries of the USB element.

At 410, the power production of the USB element may be determined. It may be determined whether the USB element is only a producer of power, whether the USB element is only a consumer of power, or whether the USB element is both a consumer and a producer of power. If the USB is only a producer of power, method 400 may proceed to 420. If the USB element is only a consumer of power, method 400 may proceed to 415. If the USB element is both a consumer and a producer of power, method 400 may proceed to 445.

At 415, in one embodiment the port associated with a USB element that is only a consumer of power may be designated as a downstream port based upon the determination that the USB element is only a consumer of power. Furthermore, the USB element may be designated as a USB device based upon the determination that the USB element is only a consumer of power. The designations may be made persistent until the USB device is detached. Method 400 may proceed to 450.

At 420, in one embodiment it may be further determined whether the USB device that is to be only a producer of power experiences an enumeration process. To begin, a timeout period may be set. The timeout period may correspond to a length of time a USB element takes to initiate an enumeration process. At 425, it may be determined whether the timeout period has expired, or whether the enumeration process has started. If so, method 400 may proceed to 430. Otherwise, method 400 may return to 425.

At 430, in one embodiment it may be determined whether the enumeration process started during the amount of time allotted. If no, method 400 may proceed to 440. If so, method 400 may proceed to 435.

At 435, in one embodiment if the USB element is only a producer of power, and an enumeration process was started, the port associated with the USB element may be designated as an upstream port. The USB element may be designated as a host. The designation may persist until the USB element detaches. Method 400 may proceed to 450.

At 440, in one embodiment if the USB element is only a producer of power and an enumeration process was not started, the port associated with the USB element may be designated as a downstream port. The USB element may be designated as a USB device. The USB element may be handled or treated as a power adapter. The designation may persist until the USB element detaches. Method 400 may proceed to 450.

At 445, further negotiations or queries may be performed between the USB hub, the newly attached USB element, or any other hosts to determine the status of the USB element. For example, the host may perform negotiations with the USB element to provide power from the hub while allowing the USB element to request USB host properties. The USB element may be treated, for example, as a laptop.

At 450, method 400 may optionally repeat at, for example, 405 or may terminate.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

The invention claimed is:

1. An apparatus, comprising:
a processor;
a non-transitory machine-readable medium coupled to the processor and comprising instructions, the instructions, when loaded into the processor and executed, configure the processor to:
identify that a USB element has attached to a USB hub at a port;
determine power operations of the USB element;
classify the USB element according to power operations of the USB element;
determine whether to operate the port in either upstream operation or downstream operation based on the determination of the power operations of the USB element;
assign a setting defining whether the port uses either upstream or downstream operation based upon the classification of the USB element based on the determination of power operations of the USB element;
classify the USB element as only a producer of power;
based on the classification of the USB element as only a producer of power, evaluate whether an enumeration process is initiated within a timeout period; and
based on a determination that the enumeration process is initiated within the timeout period, set the port as an upstream port.

2. The apparatus of claim 1, further comprising instructions for configuring the processor to:
identify that another USB element has attached to the USB hub at another port;
determine power operations of the other USB element;
classify the other USB element as only a consumer of power; and
based on the classification of the other USB element as only a consumer of power, set the other port as a downstream port.

3. The apparatus of claim 1, further comprising instructions for configuring the processor to:
identify that another USB element has attached to the USB hub at another port;
determine power operations of the other USB element;
classify the other USB element as only a consumer of power; and
based on the classification of the other USB element as only a consumer of power, designate the other USB element as a USB device with respect to the hub.

4. The apparatus of claim 1, further comprising instructions for configuring the processor to:
identify that another USB element has attached to the USB hub at another port;
determine power operations of the other USB element;
classify the other USB element as only a consumer of power; and
based on the classification of the other USB element as only a consumer of power, set the other port as a downstream port until the other USB element detaches.

5. The apparatus of claim 1, further comprising instructions for configuring the processor to:
based on the classification of the USB element as only a producer of power, set a timeout period to evaluate whether to handle the USB element as a USB host or a USB device.

6. The apparatus of claim 1, further comprising instructions for configuring the processor to:
based on the classification of the USB element as only a producer of power, evaluate whether an enumeration process is initiated to determine whether to handle the USB element as a USB host or a USB device.

7. The apparatus of claim 1, further comprising instructions for configuring the processor to:
based on the classification of the USB element as only a producer of power, evaluate whether the enumeration process is initiated to determine whether to set the port as a downstream port or an upstream port.

8. An apparatus, comprising:
a processor;
a non-transitory machine-readable medium coupled to the processor and comprising instructions, the instructions, when loaded into the processor and executed, configure the processor to:
identify that a USB element has attached to a USB hub at a port;
determine power operations of the USB element;
classify the USB element according to power operations of the USB element;
determine whether to operate the port in either upstream operation or downstream operation based on the determination of the power operations of the USB element;

assign a setting defining whether the port uses either upstream or downstream operation based upon the classification of the USB element based on the determination of power operations of the USB element;
classify the USB element as only a producer of power;
based on the classification of the USB element as only a producer of power, evaluate whether an enumeration process is initiated within a timeout period; and
based on a determination that the enumeration process is not initiated within the timeout period, setting the port as a downstream port.

9. The apparatus of claim 1, further comprising instructions for configuring the processor to:
based on a determination that the enumeration process is initiated within the timeout period, assign the USB element as a USB host.

10. The apparatus of claim 8, further comprising instructions for configuring the processor to:
the USB element as only a producer of power;
based on the classification of the USB element as only a producer of power, evaluate whether an enumeration process is initiated within a timeout period; and
based on a determination that the enumeration process is not initiated within the timeout period, assign the USB element as a USB device.

11. The apparatus of claim 1, further comprising instructions for configuring the processor to:
classify the USB element as only a producer of power;
based on the classification of the USB element as only a producer of power, evaluate whether an enumeration process is initiated within a timeout period; and
based on a determination that the enumeration process is not initiated within the timeout period, handle the attachment as a power adapter.

12. The apparatus of claim 1, further comprising instructions for configuring the processor to:
identify that another USB element has attached to the USB hub at another port;
determine power operations of the other USB element;
classify the other USB element as capable of both producing and receiving power;
based on the classification of the other USB element as capable of both producing and receiving power, treat the other USB element as a laptop.

13. The apparatus of claim 1, further comprising instructions for configuring the processor to:
identify that another USB element has attached to the USB hub at another port;
determine power operations of the other USB element;
classify the other USB element as capable of both producing and receiving power;
based on the classification of the other USB element as capable of both producing and receiving power, negotiate with the other USB element to provide power from the hub while allowing the other USB element to request USB host properties.

14. A USB hub, comprising:
a processor;
a USB port;
a non-transitory machine-readable medium coupled to the processor and comprising instructions, the instructions, when loaded into the processor and executed, configure the processor to:
identify that a USB element has attached to the USB hub at the USB port;
determine power operations of the USB element;
classify the USB element according to power operations of the USB element;
determine whether to operate the port in either upstream operation or downstream operation based on the determination of the power operations of the USB element;
assign a setting defining whether the port uses either upstream or downstream operation an upstream or downstream setting of the port based upon the classification of the USB element based on the determination of power operations of the USB element;
classify the USB element as only a producer of power;
based on the classification of the USB element as only a producer of power, evaluate whether an enumeration process is initiated within a timeout period; and
based on a determination that the enumeration process is initiated within the timeout period, set the port as an upstream port.

15. A method of operating a universal serial bus (USB) hub, comprising:
identifying that a USB element has attached to the hub at a port;
determining power operations of the USB element;
classifying the USB element according to power operations of the USB element;
determining whether to operate the port in either upstream operation or downstream operation based on the determination of the power operations of the USB element; and
assigning a setting defining whether the port uses either upstream or downstream operation based upon the classification of the USB element based on the determination of power operations of the USB element;
classifying the USB element as only a producer of power; and
based on the classification of the USB element as only a producer of power, setting a timeout period;
evaluating whether an enumeration process is initiated during the timeout period to determine whether to handle the USB element as a USB host or a USB device or to set the port as a downstream port or an upstream port.

16. The method of claim 15, further comprising:
classifying another USB element connected to another port of the hub as only a consumer of power;
based on the classification of the other USB element as only a consumer of power, setting the other port as a downstream port until the other USB element detaches; and
based on the classification of the other USB element as only a consumer of power, designating the other USB element as a USB device with respect to the hub until the other USB element detaches.

17. The method of claim 15, further comprising:
based on a determination that the enumeration process is not initiated within the timeout period, handling the attachment as a power adapter.

18. The method of claim 15, further comprising:
classifying another USB element connected to the hub as capable of both producing and receiving power;
based on the classification of the other USB element as capable of both producing and receiving power, negotiating with the other USB element to provide power from the hub while allowing the other USB element to request USB host properties.

19. A USB hub, comprising:
a processor;

a USB port;
a non-transitory machine-readable medium coupled to the processor and comprising instructions, the instructions, when loaded into the processor and executed, configure the processor to:
identify that a USB element has attached to the USB hub at the USB port;
determine power operations of the USB element;
classify the USB element according to power operations of the USB element;
determine whether to operate the port in either upstream operation or downstream operation based on the determination of the power operations of the USB element;
assign a setting defining whether the port uses either upstream or downstream operation an upstream or downstream setting of the port based upon the classification of the USB element based on the determination of power operations of the USB element
classify the USB element as only a producer of power;
based on the classification of the USB element as only a producer of power, evaluate whether an enumeration process is initiated within a timeout period; and
based on a determination that the enumeration process is not initiated within the timeout period, setting the port as a downstream port.

* * * * *